Aug. 14, 1934.   E. NIELSEN   1,969,899
COFFEE GRINDER ATTACHMENT
Filed Feb. 15, 1933   3 Sheets-Sheet 1
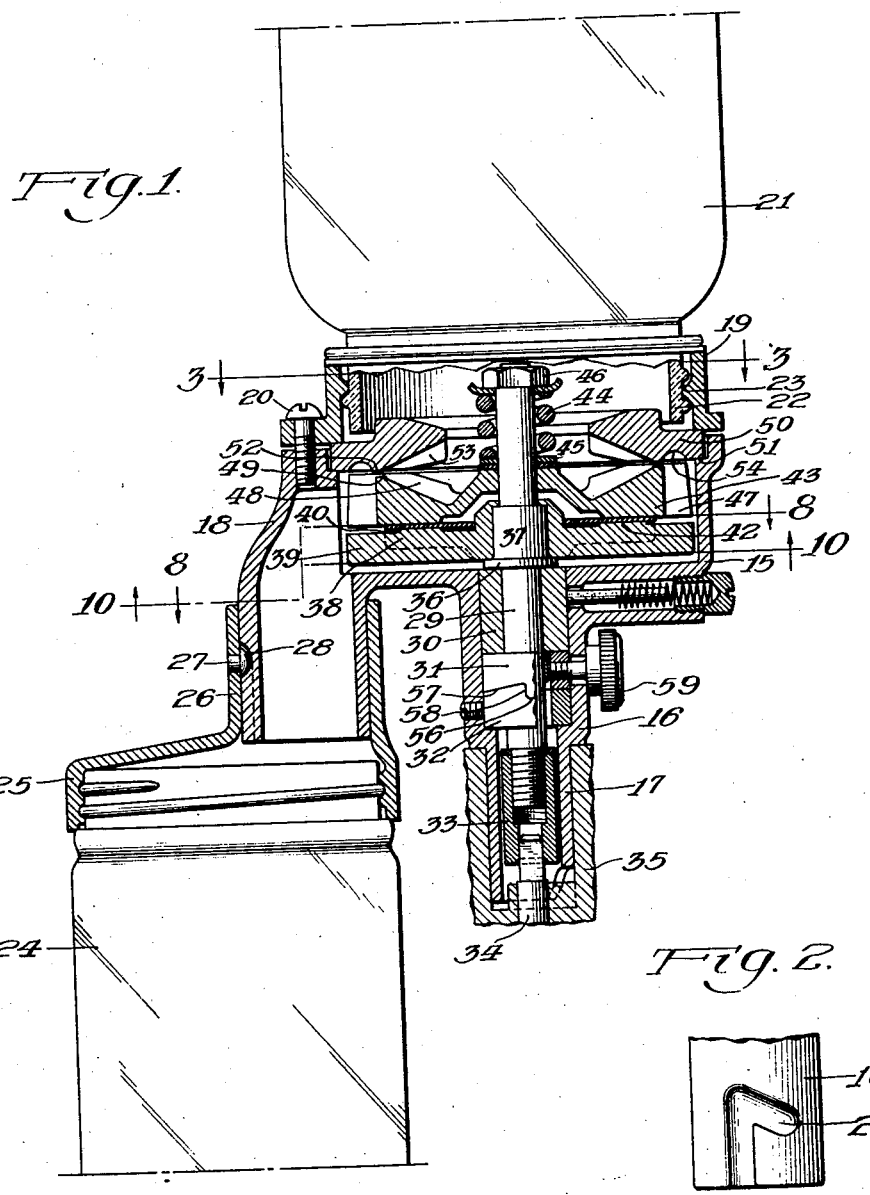

Aug. 14, 1934. E. NIELSEN 1,969,899
COFFEE GRINDER ATTACHMENT
Filed Feb. 15, 1933 3 Sheets-Sheet 2

Inventor:
Emanuel Nielsen
By Bertha L. MacGregor
Attorney

Aug. 14, 1934.  E. NIELSEN  1,969,899
COFFEE GRINDER ATTACHMENT
Filed Feb. 15, 1933   3 Sheets-Sheet 3

Inventor:
Emanuel Nielsen,
By Bertha L. MacGregor
Attorney

Patented Aug. 14, 1934

1,969,899

UNITED STATES PATENT OFFICE 1,969,899

COFFEE GRINDER ATTACHMENT

Emanuel Nielsen, Racine, Wis., assignor to Hamilton Beach Manufacturing Company, Racine, Wis., a corporation of Wisconsin Application February 15, 1933, Serial No. 656,892

6 Claims. (Cl. 83—18)

This invention relates to coffee grinders and more particularly to portable coffee grinder attachments adapted to be operatively connected to a power unit comprising a motor, gear housing and gearing. If desired, the power unit may be the motor, gear housing and gearing of a food mixer or combination food mixer and juice extractor.

One of the objects of the invention is to provide means for preventing injury to the motor and gearing in the event stones or other hard foreign substances in the coffee become engaged between the cutters. When the grinder attachment is used in connection with the motor and gearing of a conventional food mixer, the cutters are driven at the speed of the mixer drive shaft, and the power and speed of these motors are such that the presence of hard foreign substances between the cutters results in placing a heavy load on the motor which causes injury to the cutters or the driving means.

Another object is to provide dependable means for adjusting the movable cutter relatively to the stationary one to vary the degrees of fineness of the coffee being ground.

Another object is to provide a receiving container for the ground coffee, provided with a member which serves as a cover for the container, a spout for pouring ground coffee out of the container and a coupling for removably attaching the container to the grinder.

Further objects and advantages will appear from the following description.

In the drawings:

Fig. 1 is a vertical sectional view of a coffee grinder attachment embodying my invention, the same being shown in operative position on the gear housing of a power unit (the latter being broken away).

Fig. 2 is an elevation of a detail of construction, i. e. the means for holding the ground coffee container on the grinder.

Figure 3:
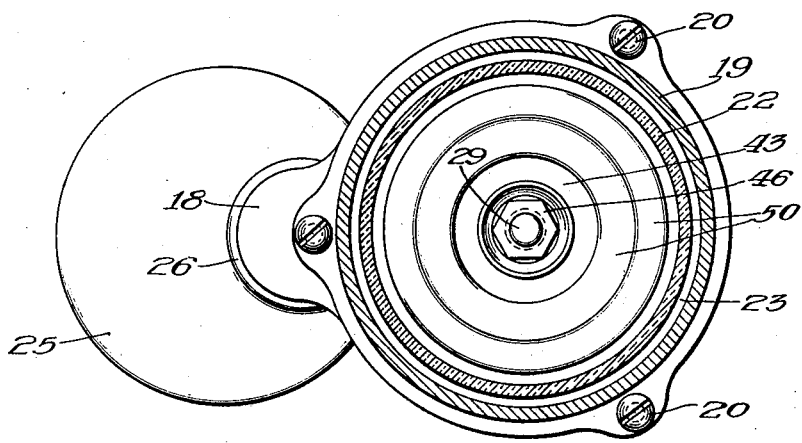
Fig. 3 is a horizontal sectional view taken on the line 3—3 of Fig. 1, looking downwardly.
Figure 4:
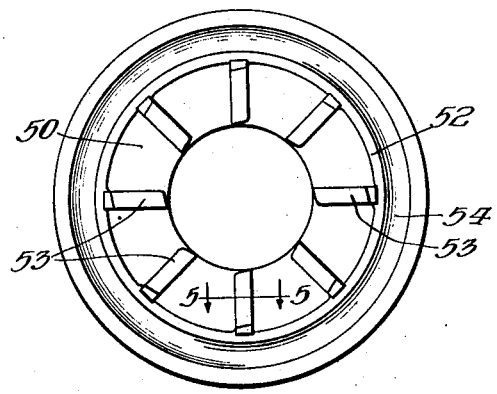
Fig. 4 is a bottom view of the upper or stationary cutter.
Figure 6:
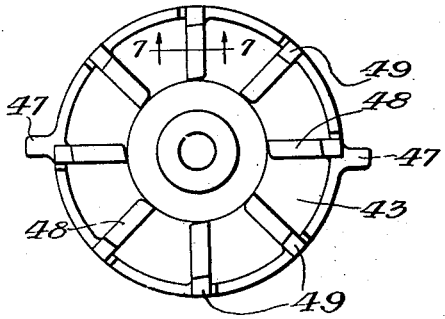
Fig. 6 is a plan view of the lower or rotatable cutter.
Figure 5:
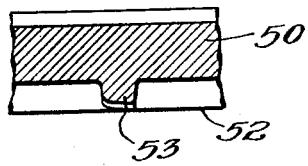
Fig. 5 is a sectional view taken on the line 5—5 of Fig. 4.
Figure 7:
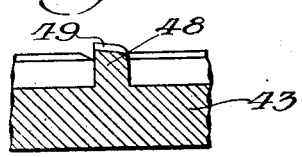
Fig. 7 is a sectional view taken on the line 7—7 of Fig. 6.

In that embodiment of the invention shown in the drawings, the main housing member 15 is substantially cup-shaped and has a centrally located depending bearing sleeve 16 terminating in an externally diminished portion 17. At one side of the housing 15 is a substantially vertical discharge member 18. An upper, ring-like housing member 19 is secured to the main housing 15 by screws 20. The coffee holder 21 has a base 22 flanged to rest on the part 19 and threaded to engage the internal threads 23 of the upper housing 19. The container 24 for ground coffee has a threaded cover 25 and an eccentrically located spout 26, the latter serving as a coupling for attaching the container 24 to the discharge member 18 of the grinder. The spout 26 carries on its inner wall a rivet 27 which is adapted to engage the walls of an L-slot 28 in the discharge member 18 to form a bayonet lock, as best shown in Figs. 1 and 2, for holding the container 24 on the grinder.

The grinder mechanism comprises a drive shaft 29 rotatably mounted in a bearing 30 in the sleeve 16. The shaft 29 extends downwardly through a pair of cam bushings 31, 32, the upper bushing 31 being rotatable relatively to the lower bushing 32 which is fixed to the sleeve or housing 16, for a purpose to be described. The lower end of the shaft 29 has secured thereto a coupling sleeve 33 having a bore which is square in cross section to receive and engage the square end of a power shaft 34 of any suitable power unit. Only part of the socketed gear housing of the power unit is indicated at 35, the end 17 of the bearing sleeve 16 being non-rotatably mounted in said gear housing.

Figure 10:
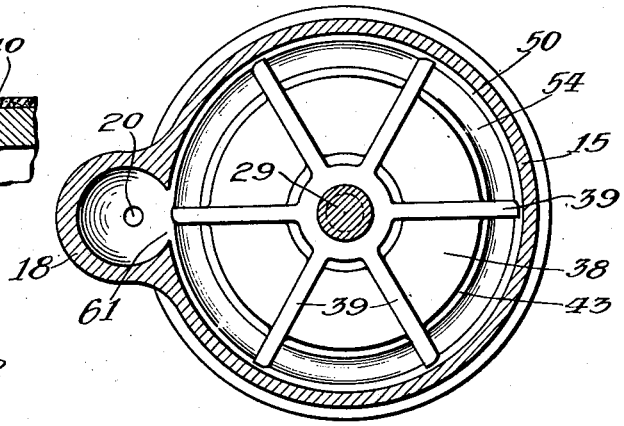
Fig. 10 is a horizontal section taken on the line 10—10 of Fig. 1, looking upwardly as indicated by the arrows, and showing the bottom of the clutch disc.

Above the bearing 30, the drive shaft 29 has fixed to it a ring or flange 36 which rests on the bearing 30. A centrally apertured clutch disc 38 is mounted on the part 37 of the drive shaft 29 to rotate therewith. The lower surface of the clutch disc 38 is spaced from the bottom of the cup-shaped housing 15, as shown by dotted lines in Fig. 1, and the clutch disc is provided with a plurality of radially extending ribs 39 which depend from the bottom of the disc and project radially beyond the periphery of the disc 38 (Figs. 1, 8 and 10).

Figure 8:
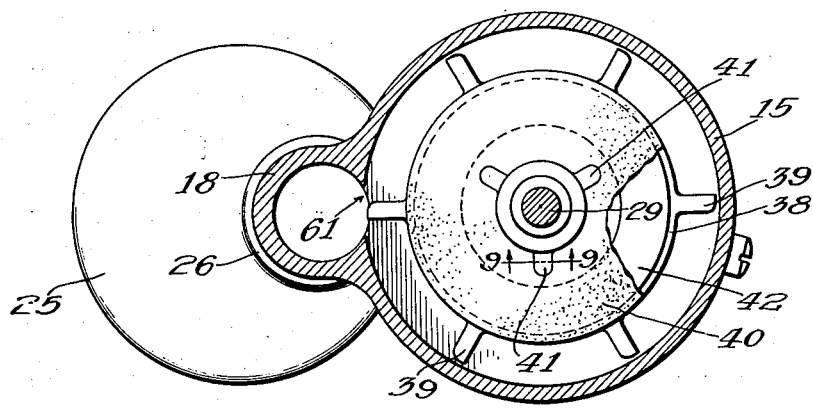
Fig. 8 is a horizontal sectional view taken on the line 8—8 of Fig. 1, looking downwardly, showing the clutch discs.
Figure 9:
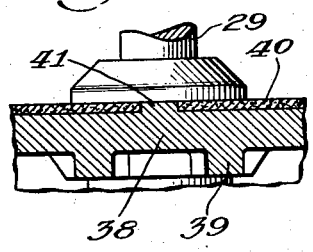
Fig. 9 is a vertical section taken on the line 9—9 of Fig. 8.

A fibre disc 40 is located above the clutch disc 38 and is held against movement relatively to the clutch disc by the raised members or flat projections 41 which register with complementally shaped apertures in the fibre disc 40, as best shown in Figs. 8 and 9. The clutch disc 38 has an annular slightly raised surface 42 on which the fibre disc rests.

A rotatable cutter 43 is loosely mounted on the shaft 29 and is held in bearing contact with the fibre disc 40 by the coiled spring 44 which surrounds the shaft 29 and bears at one end on the central portion of the cutter 43, through washers 45, and is held under tension by a washer and nut 46 on the upper end of the shaft 29. The cutter 43 has a radially projecting fin 47 at each side and blades 48 on its upwardly and outwardly inclined upper surface. The peripheral upper surface of the cutter 43 is indicated at 49.

The upper or stationary cutter 50 rests on an annular shoulder 51 of the housing 15. Its lower surface is opposed to the cutter 43 and is oppositely inclined. A flat annular surface 52 registers with the surface 49 of the cutter 43. Radial blades 53 extend from the open center to said surface 52. Outwardly of the surface 52 is an annular groove 54.

The washer beneath the nut 46 is a winged washer which serves not only as a shoulder for the spring 44 but as an agitator for keeping the coffee beans moving to the cutters.

Figure 11:
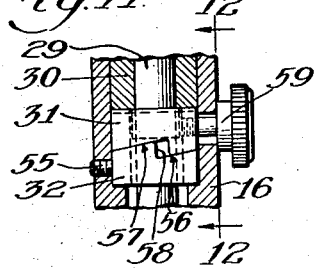
Fig. 11 is a vertical section showing the adjusting device.
Figure 12:
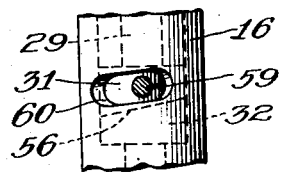
Fig. 12 is a section taken on the line 12—12 of Fig. 11.

Reverting now to the cam bushings 31 and 32, and referring particularly to Figs. 11 and 12, the lower bushing 32 is fixed to the bearing sleeve 16 by a screw 55 and the upper bushing 31 is rotatably mounted in the sleeve between the bearing 30 and bushing 32. The upper edge of the bushing 32 is inclined upwardly from opposite points, forming the inclined cam surfaces 56 and 57 connected by the vertical surfaces 58. The lower edge of the bushing 31 is shaped complementally to the surfaces 56, 57 and 58. As shown in Fig. 1, the complemental surfaces are in such engagement with each other that the bushing 31 (and consequently also the bearing 30, clutch discs 38, 40, and lower cutter 43) is in its lowermost position. In order to slightly raise the cutter 43 for the purpose of finely adjusting the cutters 43 and 50, the upper bushing 31 may be raised by means of the headed screw 59 fixed in the bushing and extending through the inclined slot 60 in the sleeve 16. The screw is loosened, then manually moved to rotate the bushing 31, and then tightened again to hold the bushing in adjusted position. In Fig. 11 the bushing 31 has been moved from the position of Fig. 1, whereby the bushing 31, bearing 30, clutch discs 38, 40 and cutter 43 are slightly raised. Thus the relative positions of the cutters may be adjusted to a fine degree.

In operating the grinder, power is transmitted from the shaft 34 to the drive shaft 29, and the clutch discs 38, 40 are rotated.

By reason of the yielding engagement between the disc 40 carried on disc 38, and the loosely mounted cutter 43, the latter is carried with the positively driven clutch disc 38 and normally these three parts, 38, 40 and 43, function as one. In the event hard foreign matter lodges between the cutters 43 and 50, the cutter 43 is restrained from rotation, but the non-rigid connection between the parts 43, 40 and 38 under spring tension is such that the positively driven clutch disc 38 may continue to rotate, while the cutter 43 is prevented from rotating, without injury to the cutter or the driving means. While the clutch discs 38 and 40 are thus slipping relatively to the cutter 43, the motor shaft will be slowed down, and the ceasing of the grinding sound will direct the user's attention to the fact that an obstruction is present.

Coffee to be ground passes from the open bottom holder 21 into the housing 19 to the cutters 43 and 50. When it has been cut into particles small enough to pass between the surfaces 49 and 52, the ground coffee falls into the housing 15 between the radial ribs 39 of the clutch disc 38 to the floor of the housing 15, from which it is moved by the ribs 39 past the discharge opening 61 leading to the discharge member 18.

The eccentric location of the spout and coupling means 26 of the container 24 permits the grider unit and discharge member 18 to be very compactly arranged. The clutch and cutter arrangement practically insure freedom from injury to the cutters and to the driving mechanism.

Changes may be made in details of construction without departing from the scope of my invention and I do not intend to be limited to the exact form shown and described, except as set forth in the appended claims.

I claim:—

1. A coffee grinder comprising a housing, a centrally apertured stationary cutter mounted in said housing, a drive shaft rotatably mounted in said housing and having an end portion provided with an abutment extending through the aperture in said stationary cutter, a clutch member fixedly mounted on said drive shaft, a rotatable cutter loosely mounted on said drive shaft between said stationary cutter and clutch member, yielding means interposed between the abutment on said drive shaft and said rotatable cutter for holding said rotatable cutter and clutch member in frictional engagement, bearing means interposed between said housing and drive shaft and providing a thrust bearing for the adjacent face of said clutch member, and means carried by said housing for adjusting said bearing means axially, whereby the rotatable cutter may be adjusted relative to said stationary cutter.

2. A coffee grinder comprising a housing, a centrally apertured stationary cutter mounted in said housing, a drive shaft rotatably mounted in said housing and having an end portion provided with an abutment extending through the aperture in said stationary cutter, a rotary discharge member fixedly mounted on said drive shaft and having a frictional driving surface, a rotatable cutter loosely mounted on said drive shaft between said stationary cutter and the frictional driving surface of said discharge member, yielding means interposed between the abutment on said drive shaft and said rotatable cutter for holding said rotatable cutter and discharge member in driving engagement, bearing means interposed between said housing and drive shaft and providing a thrust bearing for the adjacent face of said rotary discharge member, and means carried by said housing for adjusting said bearing means axially, whereby the rotary cutter may be adjusted relative to the stationary cutter.

3. A coffee grinder comprising a housing, a centrally apertured stationary cutter mounted in said housing, a vertical drive shaft rotatably mounted in said housing and having its upper end portion projecting into the aperture in said stationary cutter, an agitator extending laterally from the upper end of said drive shaft, a clutch carrying member fixedly mounted on said drive shaft, a rotatable cutter loosely mounted on said drive shaft between said stationary cutter and clutch carrying member, a coiled spring encircling the drive shaft and bearing at its opposite ends on said agitator and rotatable cutter for holding said rotatable cutter in frictional engagement with said clutch carrying member, bearing means interposed between said housing and drive shaft and providing a thrust bearing for the adjacent face of said clutch carrying member, and means carried by said housing for moving said bearing means axially to adjust the rotary cutter relative to the stationary cutter.

4. A coffee grinder comprising a housing, a centrally apertured stationary cutter mounted in said housing, a drive shaft rotatably mounted in said housing and having an end portion provided with an abutment extending through the aperture in said stationary cutter, a clutch member fixedly mounted on said drive shaft, a rotatable cutter loosely mounted on said drive shaft between said stationary cutter and clutch member, yielding means interposed between the abutment on said drive shaft and said rotatable cutter for holding said rotatable cutter and clutch member in frictional engagement, and means for adjusting the relative positions of the cutters, said means comprising a pair of cam bushings surrounding the drive shaft, one being fixed to the housing, the other being rotatable and having a bearing in supporting engagement with the clutch member, the proximate cam faces of the bushings being complementally inclined, and means for rotating the rotatable bushing, whereby the cam faces may be moved relatively to each other for adjusting the relative positions of the cutters.

5. A coffee grinder comprising a housing, a centrally apertured stationary cutter mounted in said housing, a drive shaft rotatably mounted in said housing and having an end portion provided with an abutment extending through the aperture in said stationary cutter, a clutch member fixedly mounted on said drive shaft, a rotatable cutter loosely mounted on said drive shaft between said stationary cutter and clutch member, yielding means interposed between the abument on said drive shaft and said rotatable cutter for holding said rotatable cutter and clutch member in frictional engagement, and adjusting means for one of the cutters, said means comprising a pair of cam bushings surrounding the drive shaft, one being fixed to the housing, the other being movable relative thereto and in supporting engagement with the clutch member, the proximate cam faces of the bushings being complementally inclined, and a headed screw extending through an inclined slot in the housing and into the movable bushing for manually moving the cam faces relatively to each other and adjusting the relative positions of the cutters.

6. A coffee grinder attachment for portable power units, comprising a substantially cylindrical housing having an axially arranged tubular support extending from one side thereof, said tubular support having means for non-rotatable engagement with said power unit, a centrally apertured stationary cutter mounted within said housing, bearing means mounted in said tubular support, a vertical drive shaft extending through said tubular support and bearing means and having an end portion extending into said housing axially of said stationary cutter, a clutch member fixedly mounted on said drive shaft and supported by said bearing means, a rotatable cutter loosely mounted on said drive shaft between said stationary cutter and clutch member, yielding means carried by said drive shaft and holding said rotatable cutter and clutch member in frictional engagement, and means carried by said tubular support for adjusting said bearing means axially, whereby said clutch and rotatable cutter may be adjusted relative to the stationary cutter.

EMANUEL NIELSEN.